(12) United States Patent
Bishop et al.

(10) Patent No.: US 12,606,282 B2
(45) Date of Patent: Apr. 21, 2026

(54) SYSTEM FOR ASCERTAINING PREDICTION DATA

(71) Applicant: Dunlop Oil & Marine Ltd., Pyewipe (GB)

(72) Inventors: Simon Bishop, Beverley (GB); Paul Staton, Grimsby (GB)

(73) Assignee: DUNLOP OIL & MARINE LTD., Pyewipe (GB)

( * ) Notice: Subject to any disclaimer, the term of this patent is extended or adjusted under 35 U.S.C. 154(b) by 437 days.

(21) Appl. No.: 18/253,777

(22) PCT Filed: Nov. 20, 2020

(86) PCT No.: PCT/EP2020/082886
§ 371 (c)(1),
(2) Date: May 20, 2023

(87) PCT Pub. No.: WO2022/106024
PCT Pub. Date: May 27, 2022

(65) Prior Publication Data
US 2024/0017802 A1     Jan. 18, 2024

(51) Int. Cl.
B63B 71/00 (2020.01)
B63B 22/00 (2006.01)
(Continued)

(52) U.S. Cl.
CPC .............. B63B 71/00 (2020.01); B63B 22/00 (2013.01); B63B 27/34 (2013.01); F16L 11/133 (2013.01)

(58) Field of Classification Search
CPC ......... B63B 71/00; B63B 22/00; B63B 27/34; F16L 11/133
See application file for complete search history.

(56) References Cited

U.S. PATENT DOCUMENTS

| | | | |
|---|---|---|---|
| 2016/0091318 A1* | 3/2016 | Silfven | G01C 21/203 |
| | | | 701/439 |
| 2020/0156926 A1* | 5/2020 | Bishop | B67D 9/00 |

FOREIGN PATENT DOCUMENTS

| | | | | |
|---|---|---|---|---|
| EP | 2506235 A2 * | 10/2012 | | G08G 3/02 |
| EP | 3604108 A1 * | 2/2020 | | F16L 1/24 |

(Continued)

OTHER PUBLICATIONS

The International Search Report and the Written Opinion of the International Searching Authority mailed on Jul. 27, 2021 for the priority PCT Application No. PCT/EP2020/082886.

(Continued)

*Primary Examiner* — S. Joseph Morano
*Assistant Examiner* — Jovon E Hayes
(74) *Attorney, Agent, or Firm* — Lippes Mathias LLP

(57) ABSTRACT

The invention relates to a system (2) for ascertaining prediction data. The system (2) has a floating unit (4) and a remote base unit (6). The floating unit (4) has a coupling unit (8), a floating hose (10) and a detection system (12). A first end (14) of the floating hose (10) is connected to the coupling unit (8). The detection system (12) is designed to detect, as actual arrangement, a present geometric arrangement of the floating hose (10) relative to the monitoring unit. In addition, the detection system (12) is configured to detect and/or ascertain, as actual location, a present geographical location of the floating unit (4). The detection system (12) is additionally designed to ascertain actual location data which represent the actual location and the actual arrangement. The floating unit (4) is designed to transmit the actual location data via a signal link (18) to the base unit (6). The base unit (6) is designed to receive, as actual weather data, present weather data which represent the present wind strength, the present wind direction, a prediction of the wind strength and/or a prediction of the wind direction in each case of the (Continued)

wind at the actual location. The base unit (6) is additionally designed to receive, as actual sea data, present sea data which represent the present current strength, the present current direction, a prediction of the current strength and/or a prediction of the current direction in each case of the water at the actual location.

17 Claims, 3 Drawing Sheets

(51) Int. Cl.
_B63B 27/34_         (2006.01)
_F16L 11/133_        (2006.01)

(56)                   References Cited

FOREIGN PATENT DOCUMENTS

| | | | | | |
|---|---|---|---|---|---|
| HU | T75355 | A | * | 5/1997 | ............ F16L 11/133 |
| WO | WO-2013180496 | A2 | * | 12/2013 | ............ B63B 79/10 |
| WO | WO-2022106022 | A1 | * | 5/2022 | ............ B63B 22/00 |
| WO | WO-2022106024 | A1 | * | 5/2022 | ............ B63B 27/34 |

OTHER PUBLICATIONS

English translation of the International Search Report a for the priority PCT Application No. PCT/EP2020/082886.
Chinese Office Action dated Aug. 2, 2024 of counterpart CN application 202080107299.4.

* cited by examiner

SYSTEM FOR ASCERTAINING PREDICTION DATA

The invention relates to a system for ascertaining prediction data. The system comprises at least one floating unit. The floating unit may be, for example, a buoy, a floating hose or a combination of the buoy and the floating hose. The floating hose coupled to the buoy is used in practice in order to place the buoy together with the floating hose in the water of a sea, wherein the buoy is additionally coupled to an underwater pipeline. For example, crude oil can be delivered to the buoy via the underwater pipeline, wherein the buoy is designed to deliver the crude oil from the underwater hose to the floating hose, or vice versa. The floating hose can be coupled at a first end to the buoy so that the crude oil can flow through the floating hose. A second end of the floating hose can be coupled to a tanker so that the crude oil can be delivered to the tanker through the floating hose. When the tanker has been filled, the second end can be detached from the tanker again so that the second end of the floating hose can float freely in the sea. Some time can pass before a tanker approaches the second end of the floating hose again. During this time, the floating hose can be moved away, driven by the water of the sea and/or deflected by the wind, from the location at which the second end of the floating hose was previously left in the sea by the tanker. The floating hose can have a long length. Thus, the floating hose can have, for example, a length of more than 20 m or more than 50 m. In addition, the buoy can move to a limited degree. For the newly arriving tanker in each case, therefore, first a localization of the second floating hose, in particular of the second end of the floating hose, is required in order to make it possible for the tanker to approach the second end of the floating hose in a manner which is as friction-free as possible and in order to couple thereupon the second end of the floating hose to the tanker.

The floating unit has been explained previously with reference to an exemplary configuration with a buoy and a floating hose coupled to the buoy. In practice, however, other floating units can also be used. Thus, the floating unit can have, for example, a coupling unit arranged in stationary fashion and a buoyant floating hose, wherein a first end of the floating hose is connected to the coupling unit. In this case, the second end of the floating hose can likewise be subject to a corresponding movement owing to the movement of the water in the sea. The problems explained above in connection with the floating hose therefore apply similarly to this example.

The invention is therefore based on the object of providing information which facilitates heading a ship to a second end of the floating hose.

The object is achieved by a system having the features of claim 1. A system for ascertaining prediction data is therefore provided. The system has a floating unit and a base unit. The base unit is arranged remote from the floating unit. The floating unit has a buoyant or stationary coupling unit, a buoyant floating hose and a detection system. A first end of the floating hose is connected to the coupling unit. The detection system is designed to detect, as actual arrangement, a present geometric arrangement of the floating hose relative to the monitoring unit. In addition, the detection system is designed to detect and/or ascertain, as actual location, a present geographical location of the floating unit. The detection system is additionally configured to ascertain actual location data which represent the actual location and the actual arrangement. The floating unit and the base unit are designed in such a way as to be couplable via a signal link. The floating unit is designed to transmit the actual location data via the signal link to the base unit. The base unit is designed to receive, as actual weather data, present weather data which represent the present wind strength, the present wind direction, a prediction of the wind strength and/or a prediction of the wind direction in each case of the wind at the actual location. The base unit Is additionally designed to receive, as actual sea data, present sea data which represent the present current strength, the present current direction, a prediction of the current strength and/or a prediction of the current direction in each case of the water at the actual location. In addition, the base unit is configured to ascertain prediction data on the basis of the actual location data, the actual weather data and the actual sea data, with the result that the prediction data represent a prediction of a geographical target location of the floating hose at a future, predetermined point in time and/or with the result that the prediction data represent a prediction of a geometric target arrangement of the floating hose relative to the coupling unit for the future, predetermined point in time.

A ship heading to the floating hose can in most cases give information as to when the ship is actually arriving at the floating hose. This can then be the predetermined point in time. By means of the base unit, therefore, prediction data can be ascertained which give information on the geographical target location of the floating hose and/or the geometric target arrangement of the floating hose relative to the coupling unit. When the ship is in communications contact with the base unit or when the base unit is arranged on the ship, these prediction data can be used for steering the ship. Therefore, the ship can particularly advantageously be caused to approach the second end of the floating hose, which markedly reduces the overall complexity involved in the ship approaching the second end of the floating hose and a risk of collision of the ship with the floating hose. This is because even when the floating hose has moved in such a way that the second end points in a completely different direction than the one in which it was left when previously left in the sea, this is not relevant for a time-efficient heading of the ship to the second end of the floating hose. This is because the prediction data can be ascertained on the basis of the predetermined point in time in such a way that this point in time coincides with the arrival of the ship. The ship can therefore predetermine when it arrives at the second end of the floating hose, and the prediction data specify where the second end of the floating hose will be, at least approximately, and/or in which direction it is pointing. The prediction data are subject to a certain error probability in respect of the target location and/or the target arrangement. This is because both the target location and the target arrangement are based on a prediction which is ascertained by means of the base unit. Nevertheless, the amount of time gained is therefore already very large since the ship being steered up to the floating hose does not need to stop in advance in order to let out an auxiliary boat which finds out the location and/or the arrangement of the floating hose before the ship reaches it. Overall, therefore, the complexity involved and the time lost are considerably reduced.

The buoyant floating hose can float independently in the water. Since the floating unit comprises the buoyant hose, the floating unit is also referred to as such. The coupling unit of the floating unit does not necessarily need to be buoyant. Instead, the coupling unit can be arranged and/or fastened in stationary fashion and fixedly on land. Preferably, however, provision is made for the coupling unit to likewise be buoyant. In this case, the coupling unit can float independently. The coupling unit can be in the form of, for example, a buoyant body, such as a buoyant buoy. Furthermore, the floating unit comprises a detection system. The detection system can be formed in one or more parts. The detection system can likewise be buoyant. Preferably, however, provision is made for the detection system to be associated with the coupling unit and/or the floating hose. Thus, the detection system can be fastened on the coupling unit and/or the floating hose.

The floating hose can be in the form of a plurality of hose segments coupled one behind the other. In this case, each hose segment can as such be designed to be buoyant. A first end of the floating hose is connected to the coupling unit. As a result, a mechanical connection can be ensured between the first end of the floating hose and the coupling unit. In addition, provision is preferably made for a fluid connection to be formed between the interior of the floating hose and the coupling unit by the connection between the first end of the floating hose and the coupling unit. This is in particular advantageous when a fluid, in particular crude oil, delivered through the coupling unit is intended to be delivered through the floating hose to the second end of the floating hose.

The detection system is designed to detect the present geometric arrangement of the floating hose relative to the coupling unit. The detection system can have, for this purpose, a plurality of radio units which together form a radio network, wherein the detection system can detect the geometric arrangement of the floating hose relative to the coupling unit by means of the radio units and the radio network. The detection system can, however, also have a different configuration. Thus, the detection system can have, for example, at least one sensor, in particular an optical sensor, which is designed to detect the present geometric arrangement of the floating hose relative to the coupling unit. In this case, the detection system can be designed for pattern recognition of the floating hose in the water. The present geometric arrangement of the floating hose relative to the coupling unit is referred to as the actual arrangement.

A geometric arrangement can be understood to mean, for example, a spatial structure and/or a spatial arrangement. The geometric arrangement can be determined and/or represented, for example, by the spatial coordinates, for example in a plane, of the floating hose in relation to the coupling unit. As an alternative or in addition, the geometric arrangement can be determined and/or represented, for example, by spatial coordinates, preferably in a plane, of hose segments of the floating hose in relation to the coupling unit. The geometric arrangement can alternatively or in addition relate, for example, to the spatial orientation of the floating hose and/or the course of the center line of the floating hose in relation to the coupling unit. The geometric arrangement of the floating hose relative to the coupling unit can provide information about how and/or in which geometric form the floating hose is arranged relative to the coupling unit.

The detection system is designed to detect and/or ascertain the present geographical location of the floating unit. The detection system can be designed, for example, to receive a satellite signal, in particular a navigation signal from a satellite, and to ascertain, on the basis of this satellite signal, the dedicated geographical location. However, it is also possible for the detection system to draw a conclusion on the dedicated geographical location by actively transmitting signals and receiving reflections of this actively transmitted signal. In addition, the detection system can be designed to detect the compass direction. Furthermore, further possibilities are known which make it possible to draw a conclusion on the dedicated geographical location.

The detection system can be designed correspondingly for this purpose. A geographical location can be determined by geographical coordinates. These are often given in the sexagesimal format. A location can be given in a geographical width and length in degrees and minutes.

In addition, the detection system is designed to ascertain actual location data which represent the actual location and the actual arrangement. Therefore, information in relation to the actual location and the actual arrangement can be combined with the actual location data. The detection system can be designed for this purpose. The actual location data can be divided into data packets. The actual location and the actual arrangement can be represented by in each case different data packets.

The floating unit and the base unit are couplable via a signal link. Preferably, the mentioned signal link exists between the floating unit and the base unit. In this case, it has proven to be advantageous when the signal link is formed between the detection system of the floating unit and the base unit. The actual location data are transmitted via the signal link from the floating unit, in particular from the associated detection system, to the base unit. The floating unit and the base unit can be designed correspondingly for this purpose. The actual location data can be transmitted in packet-form or as a whole. The information relating to the present geographical location and the present geographical arrangement of the floating hose relative to the coupling unit is therefore made available to the base unit.

The base unit is used for ascertaining prediction data which represent a prediction of the target location of the floating hose for a future, predetermined point in time and/or the target arrangement of the floating hose for the future, predetermined point in time. The base unit can have, for this purpose, a corresponding processor unit which is designed and/or configured to ascertain the prediction data. On the basis of the present geographical location of the floating unit and the geometric arrangement of the floating hose relative to the coupling unit, it is possible to predict, taking into consideration the sea data and the weather data, where the floating hose will move to and in which position, namely the target location, the floating hose will be at the future, predetermined point in time and in which arrangement the floating hose, namely the geometric target arrangement, will be at the predetermined point in time. This is because the sea data give information as to how the present movement of the water in which the floating hose is floating is. The movement of the water causes a corresponding movement of the floating hose. If the water has, for example, a certain current in one direction, this likewise causes a movement of the floating hose in the direction of current of the water. The movement of the floating hose can, however, also be caused and/or influenced by the wind which is acting on the floating hose from the outside. This is because the buoyant floating hose protrudes at least partially out of the water. This results in a surface of attack on which the wind can flow and, as a result, causes a corresponding movement of the floating hose. The movement component caused by the wind and the movement component caused by the current of the water of the floating hose are superimposed, which results in a resultant movement of the floating hose. This movement caused by the water and wind can be stored in a corresponding mathematical model by the base unit. The base unit can be designed to implement this mathematical model, wherein the actual weather data and the actual sea data are included in the mathematical model as input variable. Furthermore, the actual location and the actual arrangement can enter into the mathematical model as input variable. In addition, the future, predetermined point in time can enter into the mathematical model as input variable. The mathematical model is designed and/or configured in such a way that the target location of the floating hose and/or the geometric target arrangement of the floating hose relative to the coupling unit is output depending on the input variables. If this mathematical model is therefore implemented by the base unit, the base unit as a result ascertains the prediction data which represent the geographical target location of the floating hose at the future, predetermined point in time and/or which represent the geometric target arrangement of the floating hose relative to the monitoring unit for the future, predetermined point in time. Therefore, prediction data which can be called up and/or which can be provided by the system can be ascertained by means of the system. These prediction data can be used in order to enable a particularly precise and at the same time time- and cost-efficient heading of a ship to the second end of the floating hose when the heading is intended to take place at the future, predetermined point in time. If a ship plans to, for example, couple the second end of the floating hose at a known, future and therefore predetermined point in time, this can represent the future, predetermined point in time which is used for ascertaining the prediction data. The predetermined point in time can therefore be transmitted to the base unit. The base unit can be designed to receive data which represent the future, predetermined point in time. Thereupon, the base unit can ascertain the prediction data on the basis of the actual location data, the actual weather data and the actual sea data and the now known, future, predetermined point in time. Thereupon, the base unit can be configured to send back the prediction data to the subscriber from whom the base unit has previously received the predetermined point in time or the associated data. However, provision can also be made for the prediction data to be provided by the base unit for transmission. If the subscriber therefore calls up the prediction data, the transmission of the prediction data from the base unit to the previously mentioned subscriber can take place. The transmission of the prediction data can take place in wireless or wired fashion.

As already explained above, the coupling unit can be in the form of a coupling unit arranged in stationary fashion. The coupling unit can, for this purpose, be fastened on the seabed, for example, using wire ropes in such a way that the coupling unit has a fixed location on the surface of the water of a sea. The stationary arrangement of the coupling unit therefore does not rule out the possibility of the coupling unit being buoyant. It is also possible, however, for the coupling unit to be non-buoyant. The coupling unit can in this case be arranged in stationary fashion on land. In this case, the coupling unit is referred to as a stationary, fixedly arranged coupling unit. If the coupling unit is arranged in stationary fashion, it can be assumed that the location of the coupling unit is unchangeable. In any case, is at least substantially unchangeable. The location of the coupling unit can be stored by a data store. The detection system can access this data store and, as a result, can detect the actual location of the coupling unit. The actual location of the floating unit can be determined by the actual location of the coupling unit. In principle, the actual location can, however, also be determined by an actual location of the center of the floating hose and/or the center of the combination of the coupling unit and the floating hose. Therefore, the actual location can be, for example, the central geographical location of the floating unit.

The coupling unit can be designed for connection to the buoyant floating hose. The coupling unit can have, for example, a hose connection which is connected to the first end of the floating hose. This can be a detachable connection. Thus, the first end of the floating hose can be fastened to the hose connection of the coupling unit and/or connected thereto by means of screws, for example.

A further advantageous configuration of the coupling unit arranged in stationary fashion can be formed, for example, by a coupling unit which is arranged on a dock or a building close to the water and/or another stationary apparatus arranged in or on the water. The floating hose can extend from the coupling unit into the water so that the floating hose floats in the water, starting from the coupling unit. The floating hose is in any case likewise subjected to the movement of the water and/or the wind.

An advantageous configuration of the system is characterized by the fact that the detection system is designed to receive a satellite-assisted, wireless navigation signal, wherein the detection system is configured to ascertain, as actual location, the present geographical location of the floating unit on the basis of the navigation signal. The navigation signal can be, for example, a GPS navigation signal or a navigation signal from another satellite system. By means of such navigation signals, over the course of time of the different signal components, a conclusion can be drawn in respect of the actual location of the respective receiver. The detection system can be designed correspondingly for this purpose. Therefore, the detection system can also ascertain, on the basis of the navigation signal, the present geographical location of the detection system itself and therefore also the present geographical location of the floating unit on the basis of the navigation signal. A compass signal and/or other radio signals can alternatively or additionally be received and/or detected by the detection system and used to ascertain the present geographical location of the floating unit. This present geographical location can therefore be ascertained, for example, on the basis of the navigation signal, the compass signal and other radio signals. The detection system can be designed correspondingly for this purpose.

A further advantageous configuration of the system is characterized by the fact that the coupling unit is in the form of a buoyant buoy. Therefore, the coupling unit, formed by the buoyant buoy, and the floating hose are jointly buoyant. The detection system can be borne by the buoy and/or the floating hose, with the result that the entire floating unit is buoyant.

A further advantageous configuration of the system is characterized by the fact that the detection system forms a part of the floating hose and/or the coupling unit, in particular the buoyant buoy. Thus, part of the detection system can be fastened, for example, on the floating hose and/or embedded in a rubber material of the floating hose. A further part of the detection system can be fastened on the coupling unit, in particular on the buoyant buoy. The detection system can therefore have a multi-part design, wherein the parts of the detection system are distributed on the floating hose and the coupling unit. By virtue of the multi-part configuration of the detection system, a particularly precise detection of the geometric arrangement of the floating hose relative to the coupling unit is possible. Thus, parts of the detection system which are associated with the floating hose communicate with the at least one part of the detection system which is associated with the coupling unit by radio links. Via the radio links, a radio network can be formed, wherein a conclusion can be drawn on the geometric arrangement of the floating hose relative to the coupling unit via the radio network. The detection system can be designed correspondingly for this purpose.

The floating hose is in the form of a buoyant floating hose. The floating hose can have a plurality of hose segments which are arranged one behind the other to form a hose string and are fastened to one another at the end sides in each case at the opposite ends. The floating hose can therefore also be referred to as a buoyant hose string. Buoyant is preferably understood to mean the ability to float in water, in particular in sea water. This can result in the floating hose and/or the coupling unit, in particular configured as a buoyant buoy, being arranged in each case at least sectionally independently above the surface of the water or protruding above the surface of the water. Each hose segment can be designed as a type of hose as such and/or a hose section. Each hose segment can have coupling elements at each of the two associated ends, said coupling elements being designed so that a plurality of hose segments can be coupled to one another one behind the other, that is to say in a row. The floating hose preferably has a hose channel which is designed for guiding fluid, such as crude oil, and is formed jointly by the hose segments. The hose segments are preferably coupled to one another in such a way that the fluid can be guided through the hose channel without any losses.

A further advantageous configuration of the system is characterized by the fact that the base unit is a stationary base unit. The base unit can therefore be fastened in stationary fashion on land. The base unit can be in the form of a base unit which is fixed in position and is arranged in stationary fashion on land. The arrangement of the base unit on land provides the advantage that the base unit can be subjected to maintenance work and coupled to a further data network particularly easily. In addition, the base unit can in this case have a particularly powerful processor unit which is suitable for ascertaining the prediction data particularly quickly. Furthermore, it is possible for the base unit to gain access to the actual weather data and/or the actual sea data particularly easily owing to the arrangement on land. This can, for example, take place via an Internet connection which can be established with respect to the base unit.

A further advantageous configuration of the system is characterized by the fact that the base unit is installed and/or arranged on a vehicle, in particular a ship. In this case, too, the base unit can have a particularly powerful processor unit. This is because a correspondingly large installation space can be provided on the ship in order to install and/or arrange the base unit there. The signal link between the base unit and the floating unit can also be ensured when the base unit is arranged and/or installed on the ship. In this case, the signal link is at least partially in the form of a radio signal link. The base unit and the floating unit, preferably the associated detection system, can be designed for a corresponding radio transmission.

An advantageous configuration of the system is characterized by the fact that the signal link is at least partially in the form of a radio link. The signal link in this case relates to the signal link between the floating unit and the base unit. Thus, the floating unit, in particular the associated detection system, can set up a signal link initially to a satellite, which in turn produces further links to the base unit. In this case, the signal link is partially in the form of a radio link. However, it is also possible for a direct signal link to be produced as radio link between the base unit and the floating unit, in particular the associated detection system. The floating unit, in particular the associated detection system, and the base unit can be designed for this purpose.

An advantageous configuration of the system is characterized by the fact that a mathematical computational model which maps a movement of the floating unit, in particular the associated floating hose, in the water depending on a current strength of the water, a current direction of the water, a wind strength of the wind over the water and/or a wind direction of the wind over the water is stored by the base unit, wherein the base unit is designed to ascertain the prediction data by means of the computational model as well.

In particular, the buoyant floating hose of the floating unit is buoyant and can therefore float in the water. Part of the floating hose protrudes beyond the water line of the water. The remaining part of the floating hose is arranged beneath the water line. Therefore, the floating hose can be driven both by the current of the water and by the current of the wind. The current of the water can be determined by the current strength and the current direction. The current of the wind can be determined by the wind direction of the wind and by the wind strength of the wind. Therefore, the movement of the floating hose can be ascertained by the computational model even when a known water current and/or a known wind current is acting on the floating hose. The base unit is designed to receive the present sea data and the present wind data. Therefore, the information on the wind current and the sea current which act on the water hose are available to the base unit. Therefore, the base unit is configured and/or designed to ascertain the prediction data by means of the mathematical computational model and on the basis of the actual location data, the actual weather data, the actual sea data and the future, predetermined point in time.

An advantageous configuration of the system is characterized by the fact that the base unit is designed to ascertain, as a prediction, on the basis of the actual location and the actual arrangement which are represented by the actual location data, a movement of the floating unit, in particular of the associated floating hose, by means of the computational model and the actual weather data and actual sea data which determine the current direction, current strength, wind direction and wind strength as input variable for the computational model in respect of the geographical target location and/or the geometric target arrangement. The future, predetermined point in time can be taken into consideration as further input variable. This can be transmitted to the base unit via a data signal. The base unit can therefore be designed to receive this data signal which represents the future, predetermined point in time. If the input variables are present, the computational model can be implemented with the input variables by the base unit. The base unit can have, for this purpose, a corresponding processor unit which is designed to implement the computational model. The prediction data which represent the geographical target location and/or the geometric target arrangement are output by the computational model as output variable. Therefore, a prediction of the location and the orientation of the floating hose which the floating hose will have at the future, predetermined point in time can be ascertained by means of the mathematical computational model. This prediction is based on the actual sea data and the actual wind data. These have an influence on the movement of the floating hose and can therefore be used by means of the mathematical computational model to enable the mentioned prediction. The prediction is subject to a certain error probability, however. This is because yet further influencing variables can also prevail which can influence the movement of the floating hose. Nevertheless, in practice it has been found that the prediction with the arrangement of the floating hose relative to the coupling unit actually occurring at the predetermined point in time and the actually occurring location at the predetermined point in time includes only a slight discrepancy. Therefore, the prediction data can be used very advantageously to steer a vehicle, in particular a ship, approaching the second end of the floating hose particularly precisely. As a result, time can be saved, which also results in a corresponding cost saving.

An advantageous configuration of the system is characterized by the fact that the mathematical computational model is represented by an artificial neural network. The neural network can have been trained in advance with pattern data, with the result that the neural network ensures the mathematical mapping of the computational model particularly accurately. The neural network can therefore be implemented corresponding to a mathematical model.

An advantageous configuration of the system is characterized by the fact that the base unit is designed to implement a training step for adapting the neural network on the basis of in each case newly received actual location data. The base unit can be designed, for example, to periodically receive actual location data. Using in each case newly received actual location data, prediction data can be ascertained by means of the neural network. If, thereupon, new actual location data are received again, a comparison between the actual location data and the prediction data can take place. On the basis of the difference, an adaptation of the neural network can take place. As a result, the accuracy of the ascertaining process can be increased by the neural network.

An advantageous configuration of the system is characterized by the fact that the mathematical computational model is represented by a linear mathematical computational model. The linear movement equations which represent the influence of the water current and/or the wind current on a movement of the floating hose can be represented by the linear mathematical computational model.

An advantageous configuration of the system is characterized by the fact that the base unit is at least partially in the form of a computer cloud. This may be a so-called cloud network. Provision can also be made for the base unit to be formed at least substantially completely from a computer cloud. As a result, the base unit can be produced particularly quickly.

An advantageous configuration of the system is characterized by the fact that the coupling unit, in particular the buoyant buoy, has a fluid inlet connection, which is designed for the connection for an underwater hose, wherein the coupling unit, in particular the buoyant buoy, has a fluid outlet connection, which is connected to the first end of the floating hose. The coupling unit or the buoyant buoy can have a fluid channel between the fluid inlet connection and the fluid outlet connection. Therefore, a fluid connection for directing fluid from the fluid inlet connection to the fluid outlet connection can be produced by this fluid channel. In principle, provision can also be made for fluid to be capable of flowing in the reverse direction through the fluid channel. The coupling unit or the buoyant buoy is therefore not necessarily restricted to one direction of flow. If the underwater hose is connected to the fluid inlet connection and the first end of the buoyant floating hose is connected to the fluid outlet connection, fluid, in particular crude oil, can be directed through the underwater hose and then through the fluid channel of the coupling unit or the buoy to the first end of the buoyant hose. It is thus possible to direct the fluid, in particular the crude oil, further through the buoyant floating hose up to the second end of the buoyant floating hose as well. As already mentioned, a reverse direction of flow for the fluid is in principle also possible. Thus, for example, fluid can be pumped from the second end of the buoyant floating hose through the buoyant floating hose to the coupling unit or buoy, with the result that the fluid passes through the corresponding fluid channel into the underwater pipeline.

An advantageous configuration of the system is characterized by the fact that the floating unit has a plurality of node units, which are fastened to the floating hose and preferably also to the coupling unit, in particular the buoyant buoy, in such a way that the node units are arranged distributed between the coupling unit, in particular the buoyant buoy, and a second end of the floating hose, wherein each node unit is designed to set up, by means of one associated radio unit, in each case one radio link to each of at least two of the further radio units of the respective node units, with the result that a radio network, in particular a mesh radio network, is produced. Each node unit is designed to ascertain a relative distance from each further node unit which is connected via a radio link on the basis of the respective radio link, wherein at least one of the node units forms a main unit, which is designed to collect the relative distances ascertained by the further node units via the radio links and/or the radio network. The main unit is designed to ascertain, on the basis of the collected relative distances, the actual arrangement which represents the present geometric arrangement of the floating hose relative to the coupling unit, in particular the buoyant buoy.

A geometric arrangement can be understood to mean, for example, a spatial structure and/or a spatial arrangement. The geometric arrangement of the floating hose relative to the coupling unit, in particular the buoy, can therefore give information on the geometric form in which the floating hose is arranged relative to the coupling unit, in particular the buoy. In order to make the information on the geometric arrangement of the floating hose relative to the coupling unit available for ascertaining the prediction data, provision is preferably made for the main unit to be designed to ascertain, on the basis of the collected relative distances, the geometric arrangement of the floating hose relative to the coupling unit, in particular the buoy. In this case, the relative distances preferably relate to the distances between the node units and/or to the distances from the main unit to each further node unit. If the direct distances between the node units along the floating hose are not stored by the main unit, they can likewise be taken into consideration as ascertained relative distances between the node units when ascertaining the geometric arrangement of the floating hose relative to the coupling unit, in particular the buoy. Otherwise, the stored distances between the node units can also be taken into consideration when ascertaining the geometric arrangement. The abovementioned direct distances should be understood to mean, in particular, the distance between adjacent node units along the floating hose. The relative distances which can be ascertained by means of the radio links can preferably relate to the relative distances between the main unit and each of the further node units. Using this data, it is possible to geometrically map the geometric arrangement of the floating hose relative to the coupling unit, in particular the buoy.

The node units have radio units for ascertaining the relative distances. Radio links can be established by means of the radio units, with the result that a radio network, in particular the mesh radio network, is produced. Radio signals can be exchanged via the radio links. In this case, the radio signals have a propagation time between the transmission and the subsequent reception. The radio signals can therefore be used to ascertain the distance between the corresponding radio units. The node units are preferably designed for this purpose. The radio links therefore preferably serve to ascertain the relative distances between the node units or the associated radio units. Preferably, the node units are configured in such a way that the ascertained relative distances are exchanged via the radio links of the radio network. In addition, provision can be made for each radio unit to be configured in such a way that the relative distances are ascertained by triangulation on the basis of propagation times of the signals exchanged via the radio links. Each of the node units can therefore be designed and/or referred to as an electronic node unit. Each of the node units is fixedly or detachably connected to the system. Therefore, all or at least some of the node units can be fixedly and/or detachably connected to the floating hose. However, it is also possible for at least one of the node units to be connected to the coupling unit, in particular the buoyant buoy. In addition, provision can be made for in each case one of the node units to be connected to precisely in each case one of the hose segments of the floating hose. This is the case in particular when the floating hose is formed by a plurality of hose segments or has the plurality of hose segments. Otherwise, the (further) radio units can be arranged distributed over the length of the floating hose. In this case, it has been found to be advantageous if the distance between the radio units is equal. This can therefore result in a uniform distribution of the radio units between the coupling unit, in particular the buoyant buoy, and the second end of the floating hose. If the floating hose has a multiplicity of hose segments, provision can be made for the node units to be arranged so as to be distributed in such a way that every second or every third hose segment is connected to one of the node units. Other distributions of the node units can likewise be provided.

An advantageous configuration of the system is characterized by the fact that the floating hose is formed by a plurality of hose segments which are coupled to one another in a row, wherein each hose segment is connected at least indirectly to at least one of the node units and/or each hose segment comprises in each case one of the node units. If, therefore, each hose segment is coupled to one of the node units, particularly accurate ascertainment of the geometric arrangement of the floating hose relative to the coupling unit, in particular the buoyant buoy, can be performed. The prediction data are ascertained on the basis of the ascertained geometric arrangement and taking into consideration the sea data and wind data and taking into consideration the future, predetermined point in time. The prediction data can be ascertained more accurately the more precisely the present geometric arrangement has been ascertained in advance. Therefore, the abovementioned configuration also provides the advantage that the prediction data can be ascertained particularly accurately.

Further features, advantages and possible applications of the present invention can be gleaned from the following description of the exemplary embodiments and the figures. Here, all of the features described and/or illustrated in the figures form the subject matter of the invention individually and in any desired combination, even independently of the composition thereof in the individual claims, or the back-references therein. In the figures, furthermore identical reference symbols are used for identical or similar objects.

Figure 2:
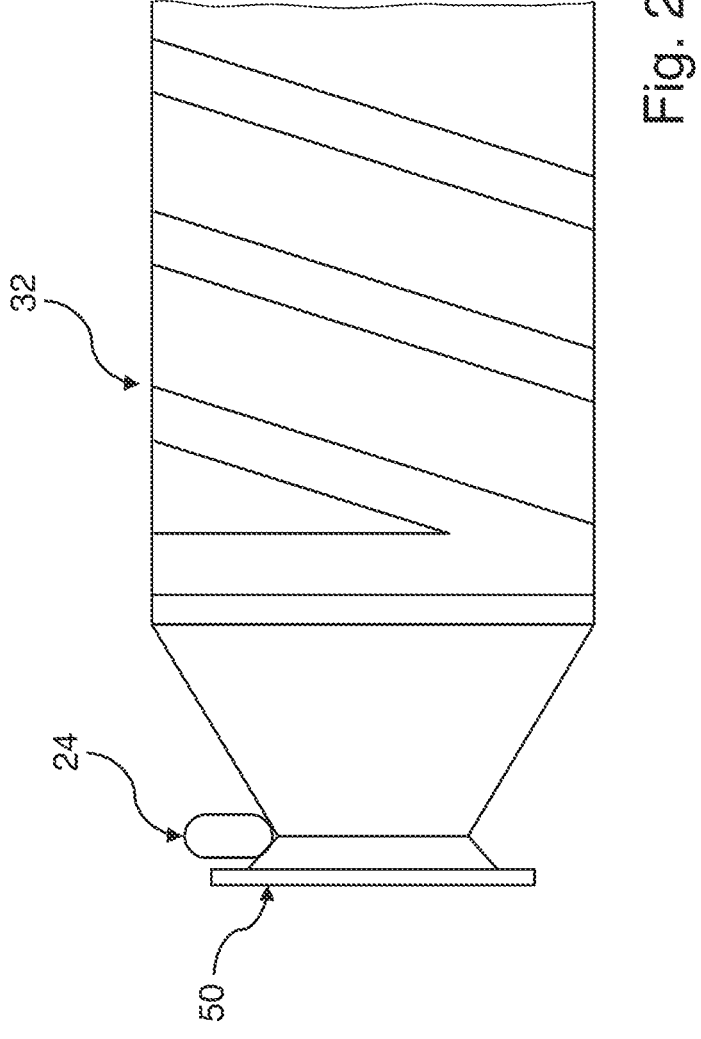
FIG. 2 shows part of a hose segment in an advantageous configuration.

The system 2 is illustrated by way of example and schematically in FIG. 2. The system 2 comprises the base unit 6 and the floating unit 4. The floating unit 4 in turn has a coupling unit 8, a buoyant floating hose 10 and a detection system 12. The coupling unit 8 is preferably buoyant. The coupling unit 8 can be configured, for example, as a buoyant buoy 22. Where mention is made in the text which follows of the coupling unit 8, it can therefore preferably be understood to mean the buoyant buoy 22. The coupling unit 8 can be arranged in stationary fashion. Thus, the coupling unit 8 can be fixed to the seabed using ropes, for example. This applies in particular even when the coupling unit 8 is buoyant. The fixing of the coupling unit 8 to the seabed can, however, also be configured in such a way that the coupling unit 8 can move within a certain range on the surface of the water in the sea.

The floating hose 10 has a first end 14 and a second end 16. The floating hose 10 is embodied as a buoyant hose. Preferably, the floating hose 10 is formed by a plurality of hose segments 32 which are connected so as to be coupled to one another and one behind the other, with the result that the floating hose 10 has and/or forms a fluid-tight channel, which is also referred to as hose channel. Each hose segment 32 is buoyant. The first end 14 of the floating hose 10 is connected to the coupling unit 8. The coupling unit 8 can have, for this purpose, a fluid outlet connection 36, which is designed to be coupled to the first end 14 of the floating hose 10. In addition, the coupling unit 8 has a fluid inlet connection 34, which is designed to be coupled to an underwater hose 48. In addition, a fluid channel can be formed between the fluid inlet connection 34 and the fluid outlet connection 36, with the result that the coupling unit 8 can provide or form a fluid connection between the first end 14 of the floating hose 10 and the underwater hose 48.

In practice, the floating hose 10 and the coupling unit 8 often float in the water of a sea, with the result that a ship can approach the second end 16 of the floating hose 10 in order to couple the second end 16 of the floating hose 10. Thereupon, the ship can take up a fluid, in particular crude oil, supplied by the underwater hose 48 via the coupling unit 8 and the floating hose 10. In this case, the fluid flows from the underwater hose 48 through the coupling unit 8 and thereupon through the floating hose 10 to the second end 16 of the floating hose 10 in order then to pass into the ship. The ship is preferably in the form of a tanker. In principle, however, there is also the possibility of the flow of fluid taking place in the reverse direction. Thus, fluid, in particular crude oil, can be fed in from the tanker at the second end 16 of the floating hose 10, with the result that the fluid, in particular the crude oil, flows through the floating hose 10, the coupling unit 8 and then into the underwater hose 48.

If the exchange of fluid, in particular crude oil, has finished, the ship will decouple the second end 16 of the floating hose 10. Thereupon, the floating hose 10 floats together with the coupling unit 8 in the water of the sea. A current of water and/or a current of wind act on the floating hose 10 and the coupling unit 8. Depending on the direction and/or the strength of the respective current, a movement of the floating hose 10 and/or the coupling unit 8 is caused. If another ship now approaches the floating hose 10, the floating hose 10 will very probably no longer be at the point at which the previous ship has decoupled the floating hose 10. The floating hose 10 can have a length of more than 10 m, more than 20 m or more than 50 m. Owing to the movement of the floating hose 10 and/or the coupling unit 8, the second end 16 of the floating hose 10 can therefore be very far removed from the previously mentioned point. For the newly arriving ship it is therefore of much interest to know in advance where the second end 16 of the floating hose 10 is and in which direction the second end 16 of the floating hose 10 is pointing. This is because, depending on this information, the newly arriving ship will take the route for heading to the second end 16 of the floating hose 10 so that the second end 16 of the floating hose 10 can be coupled to the newly arriving ship particularly easily. Normally, the path of a ship to the floating hose 10 is planned in advance. Therefore, it is also possible to predetermine the future, predetermined point in time at which the ship will arrive at the floating hose 10. This future, predetermined point in time can be transmitted to the base unit 6 via an associated input interface 42. The input interface 42 of the base unit 6 can therefore be designed for directly or indirectly receiving data which represent the future, predetermined point in time.

In order to be able to make a prediction of the geographical location, which is also referred to as target location, of the floating hose 10 at the future, predetermined point in time and/or a prediction of the geometric arrangement, which is also referred to as geometric target arrangement for short, of the floating hose 10 relative to the coupling unit 8 for the future, predetermined point in time, it has proven to be expedient if first the present geographical location of the floating hose 10 and/or the present geometric arrangement of the floating hose 10 relative to the coupling unit 8 is/are detected. Furthermore, it has proven to be expedient if present weather data and present sea data are used in order to ascertain the movement of the floating hose 10 on the basis of the present geographical location and/or the present geometric orientation and taking into consideration the present weather data and present sea data.

Figure 1:
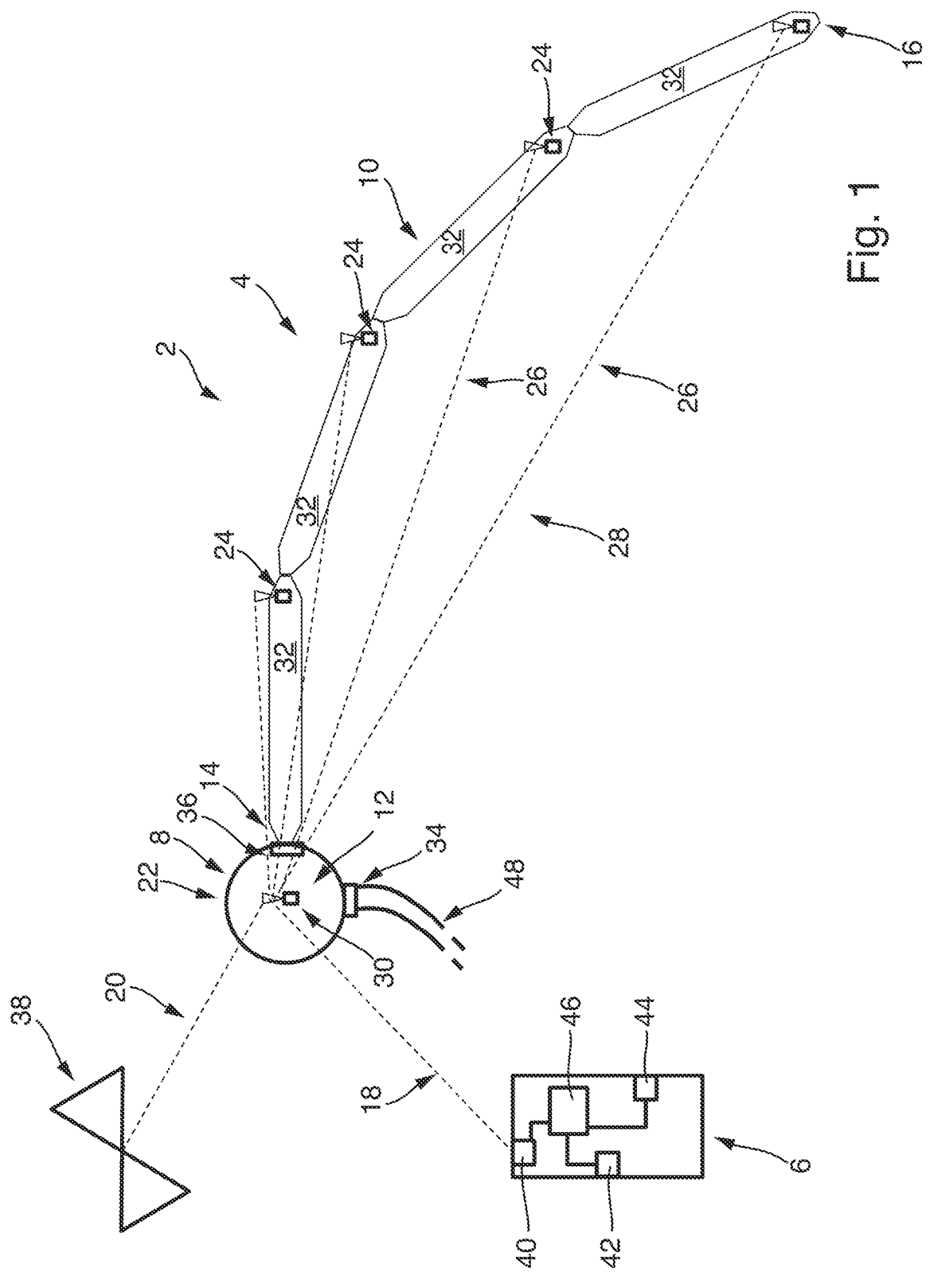
FIG. 1 shows a schematic illustration of an advantageous configuration of the system.

The floating unit 4 has the floating hose 10 and the coupling unit 8 and a detection system 12. The detection system 12 can have a multi-part configuration. Thus, the detection system 12 can have a plurality of node units 24 which are arranged distributed between the coupling unit 8 and the second end 16 of the floating hose 10. One of the node units 24 can be fastened, as main unit 30, to the coupling unit 8. Each of the node units 24 is designed to set up a radio link 26 with in each case two further ones of the node units 24. For better understanding, not all of the radio links 26 are illustrated in FIG. 1. Instead, only a few radio links 26 are indicated by dashed lines. A radio network 28 can be formed by the radio links 26. The relative distances between the node units 24 can be ascertained by the radio links 26 or the radio network 28. These relative distances can be collected by the main unit 30. On the basis of the relative distances, it is possible for the main unit to ascertain, by means of triangulation, how the distances from the main unit 30 to each of the further node units 24 are and in which angular arrangement the further node units 24 are arranged in relation to the main unit 30. On the basis of this information, a geometric arrangement of the floating hose 10 in relation to the coupling unit 8 can be ascertained. The main unit 30 can be designed for this purpose. The configuration of the detection system 12 with the plurality of node units 24, of which one of the node units 24 forms a main unit 30, is one possible variant configuration of the detection system 12. In principle, other possible configurations for the detection system 12 also exist, with the result that the detection system 12 is designed to detect, as an actual arrangement, a present geometric arrangement of the floating hose 10 relative to the coupling unit 8. Thus, the detection system 12 can be designed, for example, for optical detection of the floating hose 10 by means of an image sensor, which is arranged on the coupling unit 8. Thus, the detection system 12 can detect, by pattern recognition, the geometric arrangement of the floating hose 10 relative to the coupling unit 8. Also, as a result, a present geometric arrangement of the floating hose 10 relative to the coupling unit 8 is possible. This geometric arrangement can be detected by the detection system 12 as actual arrangement.

In addition, the detection system 12 is configured to detect and/or ascertain, as present actual location, a present geographical location of the floating unit 4. Thus, the detection system 12 can be designed, for example, to receive a navigation signal 20 from a satellite 38. The detection system 12 can also be configured to ascertain the present geographical location of the floating unit 4 on the basis of the navigation signal 20. This geographical location can be determined as actual location. In particular, provision can be made for the navigation signal 20 to be detectable by the main unit 30 of the detection system 12. In addition, provision can be made for the present geographical location to be ascertained on the basis of the navigation signal 20 by the main unit 30. The main unit 30 can thus first ascertain the present geographical location of the coupling unit 8. Owing to the mechanical coupling between the floating hose 10 and the coupling unit 8, the main unit 30 can, however, also be designed to determine a present geographical location for the entire floating unit 4. Alternatively or in addition, provision can be made for the main unit 30 to be designed and/or configured to ascertain a present geographical location of the floating hose 10 on the basis of the navigation signal 20. In this case, the present actual arrangement of the floating hose 10 relative to the coupling unit 8 can be known to the main unit 30, and this present actual arrangement can be taken into consideration in order to ascertain, on the basis thereof and the navigation signal 20, the present geographical location of the floating hose 10 as actual location for the floating unit 4.

In addition, the detection system 12 is designed to ascertain actual location data which represent the actual location and the actual arrangement. The actual location data can therefore represent the present geographical location and the present geometric arrangement. The actual location data can be ascertained by the main unit 30 of the detection system 12. The main unit 30 can be designed and/or configured for this purpose.

The floating unit 4 and the base unit 6 are designed in such a way as to be couplable via a signal link 18. The floating unit 4 and the base unit 6 are therefore preferably designed to establish a signal link 18. The base unit 6 can have a radio interface 40 for this purpose. The floating unit 4 can have the main unit 30, which is likewise designed to set up the signal link 18. This signal link 18 is not used to ascertain the relative distances, however. Thus, the main unit 30 of the floating unit 4 and the radio interface 40 of the base unit 6 can be designed to set up the signal link 18. The base unit 6 and the main unit 30 of the floating unit 4 can therefore be coupled to one another via a signal link 18. The floating unit 4 and in particular the associated main unit 30 are designed to transmit the actual location data via the signal link 18 to the base unit 6, and in particular to the associated radio interface 40. The signal link 18 can therefore be in the form of a wireless signal link 18. This can therefore be formed by radio. Therefore, a signal which represents the actual location data can be exchanged between the main unit 30 and the radio interface 40. As a result, the transmission of the actual location data to the base unit 6 can take place. The radio interface 40 can be coupled to a processor unit 46 of the base unit 6, with the result that the actual location data can be transmitted to the processor unit 46. The base unit 6 can also have an input interface 42, which is designed to receive present weather data and present sea data. The present weather data are referred to as actual weather data. The present sea data are referred to as actual sea data. The input interface 42 can likewise be coupled to the processor unit 46 of the base unit 6, with the result that the actual weather data and the actual sea data can be transmitted to the processor unit 46.

The base unit 6 is therefore designed in particular to receive, via the input interface 42, actual weather data which represent the present wind strength, the present wind direction, a prediction of the wind strength and/or a prediction of the wind direction in each case at the actual location. The actual weather data can be transmitted via a data network to the input interface 42. The base unit 6 is preferably in the form of a base unit 6 which is arranged remote from the floating unit 4. Thus, the base unit 6 can be arranged in stationary fashion on land. On the other hand, the floating unit 4, and preferably the floating hose 10 of the floating unit 4, is buoyant. The coupling unit 8 can likewise be buoyant. However, this is not absolutely necessary. Nevertheless, the floating unit 4 is referred to as such owing to the association.

The base unit 6 is also preferably designed, via the associated radio interface 40, to receive the actual sea data which represent the present current strength of the water, the present current direction of the water, a prediction of the current strength of the water and/or a prediction of the current direction of the water. With the actual weather data and the actual sea data, the data which can be sent in order to ascertain a force acting on the floating hose 10 which in turn causes a movement of the floating hose 10 are made available to the base unit 6 and in particular the associated processor unit 46. The same can apply to the coupling unit 8. Therefore, the actual weather data and the actual sea data can also be used to determine a force which is acting on the entire floating unit 4 in order to ascertain how the movement of the floating unit 4 takes place. The change in the location of the floating hose 10 and/or the coupling unit 8 and therefore also the floating unit 4 is also dependent, however, on the period of time for which the water and/or the wind is acting on the floating hose 10 and/or the coupling unit 8. In order to be able to ascertain a prediction in relation to the geographical target location and/or the target arrangement, provision is therefore preferably made for the corresponding, future, predetermined point in time to be made available to the base unit 6 or to be capable of being transmitted to this base unit 6. The input interface 42 can therefore also be designed to directly and/or indirectly receive data which represent the future, predetermined point in time. The input interface 42 can transmit the future, predetermined point in time to the processor unit 46 as well.

In addition, the base unit 6 is configured to ascertain prediction data on the basis of the actual location data, the actual weather data, the actual sea data and the future, predetermined point in time, with the result that the prediction data represent a prediction of the geographical target location of the floating hose 10 at the future, predetermined point in time and/or with the result that the prediction data represent a prediction of a geometric target arrangement of the floating hose 10 relative to the coupling unit 8 for the future, predetermined point in time. For this purpose, a mathematical computational model can be stored by the base unit 6 which can be implemented by the processor unit 46. The base unit 6, and in particular the associated processor unit 46, will implement the mathematical computational model for ascertaining the prediction data. Preferably, the mathematical computational model is configured in such a way that the mathematical computational model maps a movement of the floating unit 4, and preferably only a movement of the associated floating hose 10, in the water depending on a current strength of the water, a current direction of the water, a wind strength of the wind over the water and/or a wind direction of the wind over the water. In order to implement the mathematical computational model in order to ascertain the prediction data, provision is preferably made for the actual location data, the actual weather data, the actual sea data and the future, predetermined point in time to form input variables for the mathematical computational model. An output variable of the mathematical computational model can be the geographical target location. A further or an alternative output variable of the mathematical computational model can be the target arrangement of the floating hose 10 relative to the coupling unit 8. By virtue of the mathematical computational model being implemented by means of the processor unit 46 of the base unit 6 and on the basis of the input variables explained above, therefore, the prediction data can be ascertained, as output variable, by the base unit 6 or the associated processor unit 46, with the result that the prediction data represent a prediction of the geographical target location of the floating hose 10 at the future, predetermined point in time and/or with the result that the prediction data represent a prediction of a geometric target arrangement of the floating hose 10 relative to the coupling unit 8 for the future, predetermined point in time.

The mathematical computational model can be formed by an artificial neural network or by a linear mathematical computational model. The artificial neural network can be trained in such a way that the mapping explained above between the input variables and the output variables of the mathematical computational model is ensured. If, on the other hand, the mathematical computational model is formed by a linear mathematical computational model, this model can have been set up on the basis of deterministic mechanical function relationships. The base unit 6, and in particular the associated processor unit 46, can be formed by an individual processor unit 46. However, it is in principle also possible for the base unit 6, and in particular the associated processor unit 46, to be formed by a computer cloud.

FIG. 2 shows part of a hose segment 32 of the floating hose 10. The hose segment 32 has a connecting flange 50 at each end-side end. Two hose segments 32 can therefore be connected to one another via the connecting flange 50 arranged at the end sides. This connection can additionally be produced using screws.

An advantageous configuration of the system 2 is characterized by the fact that a node unit 24 is assigned to each hose segment 32. The respective node unit 24 can be fastened, for example, to one of the connecting flanges 50.

Figure 3:
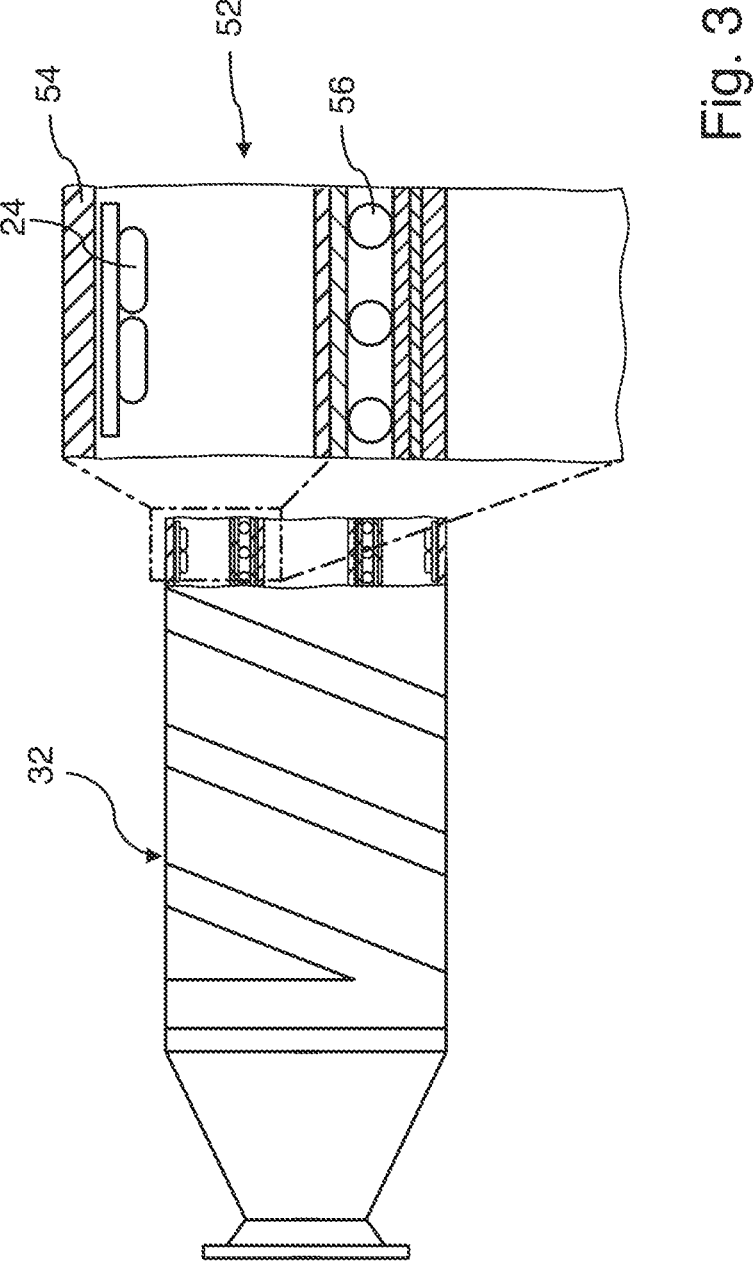
FIG. 3 shows part of a hose segment in a further advantageous configuration.

FIG. 3 shows a further advantageous configuration of the part of the hose segment 32. In this case, a cross section of the lateral wall 52 of the hose segment 32 is also shown in enlarged form. The lateral wall 52 can have an outer layer 54 made of rubber material radially on the outside. At the radially inner end section, a strengthening support 56 can be embedded in the rubber material of the lateral wall 52. In addition, provision can preferably be made for a node unit 24 to be embedded in the rubber material of the lateral wall 52. As a result, the node unit 24 can be particularly well protected from external mechanical damage.

In addition, it will be mentioned that "having" does not exclude any other elements or steps and "a" or "an" does not exclude a multiplicity. In addition, it will be mentioned that features which have been described with reference to one of the above exemplary embodiments can also be used in combination with other features of other exemplary embodiments described above. Reference symbols in the claims should not be considered to be limiting.

LIST OF REFERENCE SYMBOLS 2 system
4 floating unit
6 base unit
8 coupling unit
10 floating hose
12 detection system
14 first end (of floating hose)
16 second end (of floating hose)
18 signal link
20 navigation signal
22 buoy
24 node unit
26 radio link
28 radio network
30 main unit
32 hose segment
34 fluid inlet connection
36 fluid outlet connection
38 satellite
40 radio interface
42 input interface
44 output interface
46 processor unit
48 underwater hose
50 connecting flange
52 lateral wall
54 outer layer
56 strengthening support

The invention claimed is:

1. A system for ascertaining prediction data, the system comprising:
a floating unit;
a base unit arranged remote from the floating unit;
wherein the floating unit has a buoyant or stationary coupling unit, a buoyant floating hose and a detection system,
wherein a first end of the floating hose is connected to the coupling unit,
wherein the detection system is designed to detect, as actual arrangement, a present geometric arrangement of the floating hose relative to the coupling unit,
wherein the detection system is designed to detect and/or ascertain, as actual location, a present geographical location of the floating unit,
wherein the detection system is configured to ascertain actual location data which represent the actual location and the actual arrangement,
wherein the floating unit and the base unit are couplable via a signal link,
wherein the floating unit is designed to transmit the actual location data via the signal link to the base unit,
wherein the base unit is designed to receive, as actual weather data, present weather data which represent the present wind strength, the present wind direction, a prediction of the wind strength and/or a prediction of the wind direction in each case of the wind at the actual location, wherein the base unit is designed to receive, as actual sea data, present sea data which represent the present current strength, the present current direction, a prediction of the current strength and/or a prediction of the current direction in each case of the water at the actual location, and wherein the base unit is configured to ascertain prediction data on the basis of the actual location data, the actual weather data and the actual sea data, with the result that the prediction data represent a prediction of a geographical target location of the floating hose at a future, predetermined point in time and/or with the result that the prediction data represent a prediction of a geometric target arrangement of the floating hose relative to the coupling unit for the future, predetermined point in time.

2. The system of claim 1, the detection system (12) is designed to receive a satellite-assisted, wireless navigation signal (20), wherein the detection system (12) is configured to ascertain, as actual location, the present geographical location of the floating unit (4) on the basis of the navigation signal (20).

3. The system of claim 1, the coupling unit (8) is in the form of a buoyant buoy (22).

4. The system of claim 1, the detection system (12) forms part of the floating hose (10) and/or the coupling unit (8).

5. The system of claim 1, the base unit (6) is a stationary base unit (6).

6. The system of claim 1, the base unit (6) is installed and/or arranged on a mobile vehicle.

7. The system of claim 1, the signal link (18) is at least partially in the form of a radio link (26).

8. The system of claim 1, wherein a mathematical computational model which maps a movement of the floating unit (4) in the water depending on a current strength of the water, a current direction of the water, a wind strength of the wind over the water and/or a wind direction of the wind over the water is stored by the base unit (6), wherein the base unit (6) is designed to ascertain the prediction data by means of the computational model as well.

9. The system of claim 1, the base unit (6) is designed to ascertain, as a prediction, on the basis of the actual location and the actual arrangement which are represented by the actual location data, a movement of the floating unit (4) by means of the computational model and the actual weather data and actual sea data which determine the current direction, current strength, wind direction and wind strength as input variable for the computational model in respect of the geographical target location and/or the geometric target arrangement.

10. The system of claim 1, the mathematical computational model is
represented by an artificial neural network.

11. The system of claim 1, the base unit (6) is designed to implement a training step for adapting the neural network on the basis of in each case newly received actual location data.

12. The system of claim 1, the mathematical computational model is
represented by a linear mathematical computational model.

13. The system of claim 1, the base unit (6) is at least partially in the form of a computer cloud.

14. The system of claim 1, the coupling unit (8) has a fluid inlet connection (34), which is designed for the connection for an underwater hose (48), wherein the coupling unit (8) has a fluid outlet connection (36), which is connected to the first end (14) of the floating hose (10).

15. The system of claim 1, the floating unit (4) has a plurality of node units (24), which are fastened to the floating hose (10) in such a way that the node units (24) are arranged so as to be distributed between the coupling unit (8) and a second end (16) of the floating hose (10), wherein each node unit (24) is designed to set up, by means of one associated radio unit, in each case one radio link (26) to each of at least two of the further radio units of the respective node units (24), with the result that a radio network (28) is produced, wherein each node unit (24) is designed to ascertain a relative distance from each further node unit (24) which is connected via a radio link (26) on the basis of the respective radio link (26), wherein at least one of the node units (24) forms a main unit (30), which is designed to collect the relative distances ascertained by the further node units (24) via the radio links (26) and/or the radio network (28), and wherein the main unit (30) is designed to ascertain, on the basis of the collected relative distances, the actual arrangement which represents the present geometric arrangement of the floating hose (10) relative to the coupling unit (8).

16. The system of claim 1, the floating hose (10) is formed by a plurality of hose segments (32) which are coupled to one another in a row, wherein each hose segment (32) is connected at least indirectly to at least one of the node units (24) and/or each hose segment (32) comprises in each case one of the node units (24).

17. The system of claim 15, wherein the plurality of nodes (24) are also fastened to the coupling unit (8).

* * * * *